(12) United States Patent
Petty et al.

(10) Patent No.: US 9,330,565 B2
(45) Date of Patent: May 3, 2016

(54) TRAFFIC BOTTLENECK DETECTION AND CLASSIFICATION ON A TRANSPORTATION NETWORK GRAPH

(71) Applicant: ITERIS, INC, Santa Ana, CA (US)

(72) Inventors: Karl F. Petty, Berkeley, CA (US); Andrew J. Moylan, Berkeley, CA (US)

(73) Assignee: ITERIS, INC., Santa Ana, CA (US)

( * ) Notice: Subject to any disclaimer, the term of this patent is extended or adjusted under 35 U.S.C. 154(b) by 0 days.

(21) Appl. No.: 14/490,145

(22) Filed: Sep. 18, 2014

(65) Prior Publication Data

US 2015/0081196 A1      Mar. 19, 2015

Related U.S. Application Data

(60) Provisional application No. 61/879,165, filed on Sep. 18, 2013.

(51) Int. Cl.
| | |
|---|---|
| *G06F 19/00* | (2011.01) |
| *G08G 1/01* | (2006.01) |
| *H04W 4/02* | (2009.01) |
| *H04W 4/04* | (2009.01) |

(52) U.S. Cl.
CPC .............. *G08G 1/0133* (2013.01); *H04W 4/027* (2013.01); *H04W 4/028* (2013.01); *H04W 4/046* (2013.01)

(58) Field of Classification Search
CPC ..... G08G 1/0104; G08G 1/095; G08G 1/065; G08G 1/09; G06N 7/005; G06N 99/005; A41D 13/01; B60Q 1/53; G06F 15/18; G01C 21/34
USPC .................. 701/117, 118; 340/332, 907, 908
See application file for complete search history.

(56) References Cited

U.S. PATENT DOCUMENTS

| | | | | |
|---|---|---|---|---|
| 5,206,641 | A * | 4/1993 | Grant et al. | 340/905 |
| 5,732,383 | A * | 3/1998 | Foladare | G08G 1/0104 455/456.5 |
| 6,408,005 | B1 * | 6/2002 | Fan | H04L 12/5602 370/412 |
| 6,813,555 | B1 * | 11/2004 | Kerner | G08G 1/0104 701/117 |
| 8,681,614 | B1 * | 3/2014 | McCanne | H04L 47/522 370/230 |
| 8,804,521 | B1 * | 8/2014 | Dubois-Ferriere | H04L 47/10 370/235 |
| 2014/0222321 | A1 * | 8/2014 | Petty et al. | 701/117 |

* cited by examiner

OTHER PUBLICATIONS

Chen, "Systematic Identification of Freeway Bottlenecks", Transportation Research Board, 83rd Annual Meeting, Jan. 2004 Washington, DC, Jul. 30, 2003.

*Primary Examiner* — McDieunel Marc
(74) *Attorney, Agent, or Firm* — Lazaris IP

(57) ABSTRACT

Traffic congestion detection, classification and identification includes analysis of link-speed data representative of vehicular speed and capacity on one or more roadway segments to determine non-linear, multi-segment traffic bottlenecks in a transportation network graph. Link-speed data is processed to detect bottleneck conditions, classify bottlenecks and bottleneck-like traffic features according to their complexity, and identify sustained or recurring bottlenecks. Such a system and method of traffic congestion detection, classification and identification provides a framework for using this link-speed data to detect the head and queue of bottlenecks on a directed graph representing the transportation network, classify the resulting bottlenecks and bottleneck-like traffic features according to the shape of their queue, and identify and measure sustained or recurrent bottlenecks even when the location, or head, of the bottleneck varies slightly across multiple time periods or across multiple days.

25 Claims, 7 Drawing Sheets

TRAFFIC BOTTLENECK DETECTION AND CLASSIFICATION ON A TRANSPORTATION NETWORK GRAPH

CROSS-REFERENCE TO RELATED PATENT APPLICATIONS

This patent application claims priority to U.S. provisional application 61/879,165, filed on Sep. 18, 2013, the contents of which are incorporated in their entirety herein.

FIELD OF THE INVENTION

The present invention relates to traffic congestion detection and analysis. Specifically, the present invention relates to a system and method of detecting bottlenecks on a roadway network, and classification of bottlenecks and bottleneck-like traffic features according to their complexity.

BACKGROUND OF THE INVENTION

Bottlenecks in traffic congestion are locations on a roadway where there is a temporary or permanent drop in capacity (defined as the maximum number of vehicle throughput per second) compared to immediately-adjacent downstream locations on the same roadway. Such circumstances can lead to traffic congestion and the formation of a queue of slow or stopped vehicles behind, or upstream of, the bottleneck. The detection and removal of bottlenecks is often a priority for organizations responsible for managing roadway networks, such as state departments of transportation or private entities operating toll roads. These organizations have an interest in knowing where a bottleneck is, how long the queue of vehicles behind it is, its duration (on a given day or period of interest) and how often it recurs (such as daily, occasionally, rarely).

A bottleneck head, often referred to as the bottleneck location or just bottleneck, is the point downstream of which roadway capacity increases and traffic again flows freely. The bottleneck head is therefore the point furthest along the roadway for which capacity is reduced. A bottleneck queue is the set of points on the roadway upstream of the bottleneck head in which traffic is moving slowly (or stopped) due to the reduced capacity at the bottleneck. The bottleneck head can therefore also be thought of as simply the most downstream point in the bottleneck queue.

A sustained bottleneck is one that persists for more than one time period of interest (such as 5 minutes). For example, a bottleneck may persist for several time periods adding up to a total of 45 minutes. A recurrent bottleneck is a bottleneck that is detected at an identical or similar place, and possibly time, over multiple days.

There are several established prior art methods of analyzing bottlenecks in traffic congestion. One well-known property of a bottleneck is a sudden increase in the speed of traffic as vehicles move downstream of (i.e., beyond) the front, or head, of the bottleneck. Existing techniques have used this property to detect bottlenecks from data generated from a linear sequence of detectors (such as inductive loop detectors placed every mile or so along a stretch of freeway). In one example, the bottleneck head may be defined as a point where the detected speed of downstream traffic is at least 20 mph faster than the detected speed of upstream traffic. The bottleneck queue is defined as all points immediately upstream of the bottleneck head for which the detected speed is less than 40 mph. This method, however, only applies to data on a linear sequence of points (such as inductive loop detector locations), typically corresponding to a single named roadway. There is no existing methodology for analyzing data to detect bottlenecks in a non-linear sequence of data points, and no existing methodology for analyzing complex bottlenecks comprised of more than one single named roadway.

The above-mentioned technique also attempts to examine recurring bottlenecks on the same or different days. For example, when for 5 out of 7 consecutive time periods, a bottleneck is detected with a head at location X, then the bottleneck is "sustained". When a sustained bottleneck occurs on two different days, it is "recurrent". This existing methodology checks for bottlenecks that are sustained or recurrent at exactly the same location during each time period or day. It does not, however, detect bottleneck head locations that vary across multiple time periods during the same day (e.g. 5 minute time periods), or across multiple days.

BRIEF SUMMARY OF THE INVENTION

The present invention discloses a system and method of detecting traffic bottlenecks on a roadway network. Traffic congestion due to bottlenecks often aggravates and/or influences traffic conditions on a section of the roadway network that are not limited to a single roadway segment, or linear sequence of links. In this embodiment of the present invention, a roadway network is a directed graph of one-way links for which GIS data about the roadway network is available in directed graph or "link-node" form, for example for purchase from third-party vendors. Data representative of "link-speed" on such a directed graph representing a roadway network is used to detect bottlenecks and generalized "bottleneck-like" recurring traffic features, even where data for certain roadway links is incomplete. The link-speed data supplies estimates of the average traffic speed on all or most of the road links at regular intervals, such as for example every 5 minutes. Additional embodiment of the present invention further comprise classifying bottlenecks and bottleneck-like traffic features according to the shape of their queue, and identifying "sustained" or "recurring" bottlenecks even when the location, or head, of the bottleneck varies slightly across multiple time periods (e.g. 5 minute time periods) or across multiple days.

In light of the limitations among the prior art techniques, it is therefore one objective of the present invention to provide a system and method of detecting bottlenecks on a roadway network that is not linear or limited to a single named road. It is another objective to provide a system and method of detecting the head and queue of bottlenecks on a road network comprised of a directed graph of roadway links, given access to speed data on all or most of the links for each of several time periods. It is yet another objective of the present invention to provide a system and method of classifying bottlenecks and bottleneck-like traffic features according to their complexity. It is a further objective of the present invention to provide a system and method of identifying sustained or recurring bottlenecks even if the bottleneck head location varies slightly from day to day or during a single day.

Other embodiments, features and advantages of the present invention will become apparent from the following description of the many embodiments, which illustrate, by way of example, the principles of the invention.

BRIEF DESCRIPTION OF THE SEVERAL VIEWS OF THE DRAWINGS

The accompanying drawings, which are incorporated in and constitute a part of this specification, illustrate several embodiments of the invention and together with the description, serve to explain the principles of the invention.

DETAILED DESCRIPTION OF THE INVENTION

In the following description of the present invention reference is made to the exemplary embodiments illustrating the principles of the present invention and how it is practiced. Other embodiments will be utilized to practice the present invention and structural and functional changes will be made thereto without departing from the scope of the present invention.

Figure 1:
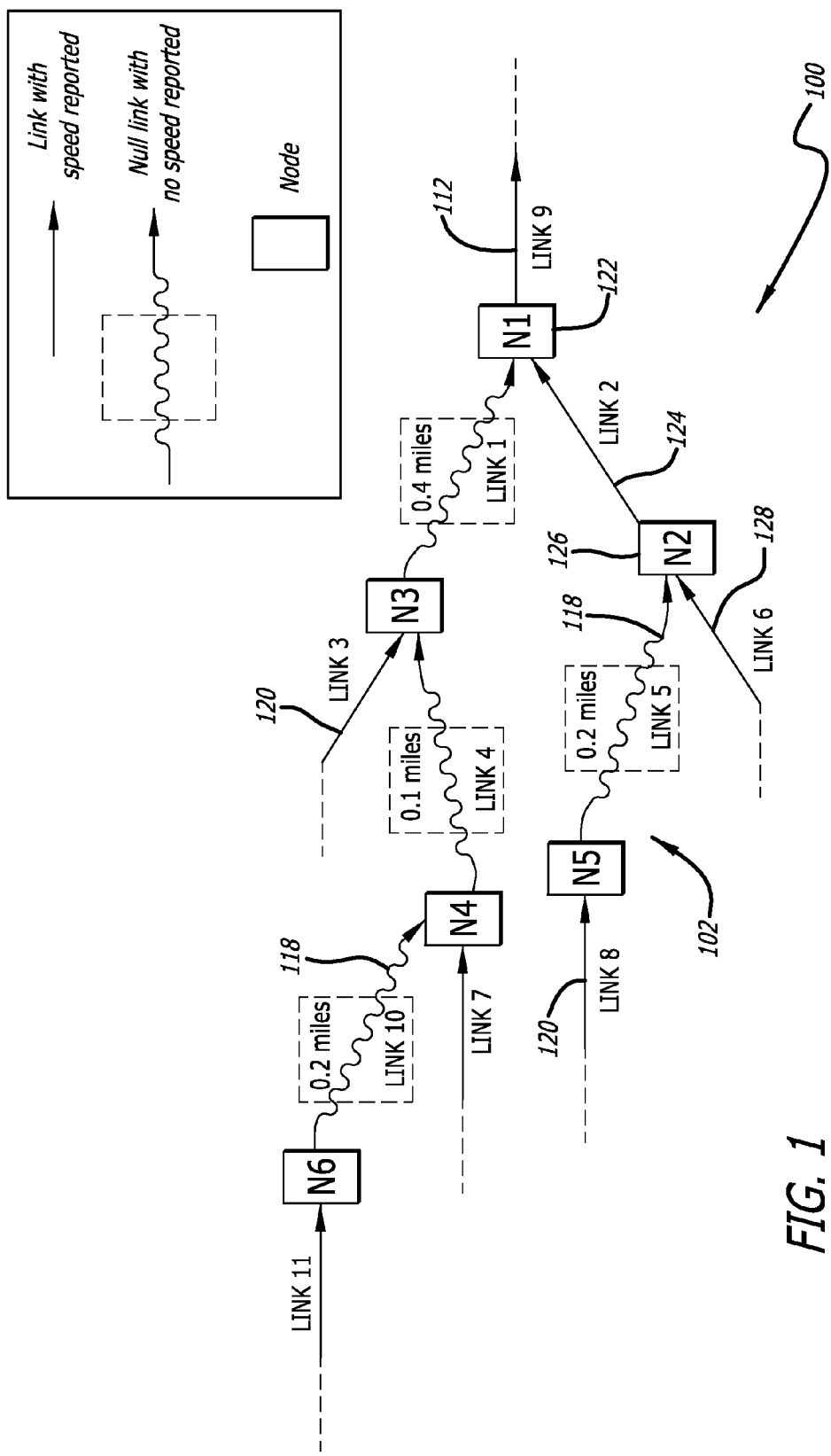
FIG. 1 is a graphical illustration of an exemplary roadway network for which link-speed data is analyzed to detect the head and queue of bottlenecks according to the present invention.

As noted above the present invention discloses a system and method of detecting traffic bottlenecks on a roadway network by analyzing speed data for roadway links, or segments, for specified time periods. This "link-speed" data is used to detect the head and queue of bottlenecks on the roadway network, represented as a directed graph of the links comprising the roadway network to be analyzed. FIG. 1 is an illustration of such a directed graph 100 of links 112 in an exemplary roadway network 102, where link-speed data 104 is analyzed to detect the head 108 and queue 110 of bottlenecks 106.

The link-speed data 104 provides vehicular speed information relative to different parts of the roadway network 102 for each time period (e.g. 5 minutes) to be analyzed. This link-speed data 104, as noted further herein, may be provided in a processed form by third party vendors, or may be provided in raw form from many different sources and subsequently modeled using a variety of different data processing paradigms to extract speed information for the particular link 112 it represents.

Regardless of whether it is provided in processed or raw form, link-speed data 104 according to the present invention may be derived from multiple types of input data 190 reflecting or representing traffic conditions on a particular section of roadway 102. These multiple categories of input data 190 may include geographical information system (GIS) data 191 of spatio-temporal location of traffic relative to a roadway network 102 and generated by any device typically used to collect such information, such as for example global positioning (GPS) devices. Input data 190 may also include general traffic data 192 collected from one or more sensors or third parties, weather data 193, incident data 194, pavement condition data 195, roadway operations data 196, and data generated by one or more integrated traffic state estimation systems 197 which incorporate at least some these categories of data to model vehicular speed on a transportation infrastructure network.

Within each of these categories, input data 190 may be historical, representative of real-time conditions over a specific time period, or predictive of a future traffic state. Regardless, as noted above, input data 190, and link-speed data 104 may be ingested and derived from a plurality of different sources and devices. For example, in the case of roadway operations data, information may be collected by on-vehicle devices such as GPS systems, AVL/MDCs, mobile applications resident on mobile devices such as "smart" phones or tablets, etc. Input data 190 may also be ingested from sensors, cameras, third party data collection services, probes, loops, radar, and many other sources. Input data 190 may be further ingested from one or more techniques for collecting crowd-sourced observations of real-time traffic conditions. It is therefore to be understood that multiple systems and methods of generating information relating to vehicular speed on a roadway network 102 may be utilized, and are within the scope of the present invention.

Regardless of the type and source of data being utilized for link-speed data 104 for processing in the present invention, however, it is also to be noted that the link-speed data 104 contemplated as input data 190 in the present invention may not use the same subdivisions of the roadway (hereinafter "traffic data links" 114, not shown) as the subdivisions used in the directed graph 100 of one-way roadway links (hereinafter "road network links" 116, also not shown) that are used for bottleneck detection, classification, and identification according to the framework 140 of the present invention. In order to overcome this potential discrepancy in relative coverage, the present invention projects data regarding traffic data links 114 onto the road network links 116. Where there are multiple road network links 116 contained in a single traffic data link 114, the present invention assigns the speed reported for the traffic data link 114 to all the multiple road network links 116. Where a single road network link 116 covers multiple traffic data links 114, the present invention averages the speed values reported for the various road traffic links 114, either by a simple average of the speed values, or by a weighted average in proportion to the amount (linear miles) of overlapping roadway between each traffic data link 114 and the road network link 116.

Additionally, the projected link-speed data 104 may not cover the entire directed graph 100 of a roadway network 102 during some or all time periods to be analyzed. In other words, at some time periods, there may be some road network links 116 for which there is no reported speed. For example, there may be no reported speeds for small connecting roads such as freeway on-ramps or off-ramps.

To overcome the possibility of missing link-speed data 104, the present invention defines links 112 for which there is no reported speed in a given time period as null links 118, while links 112 that do have reported speeds are defined as non-null links 120. For each node 122 on the directed graph 100 of the roadway network 102, the present invention defines a set of "nearby upstream" links 124. The set of nearby upstream links 124 for each node 122 includes all immediately-connected non-null upstream nodes 126 within the directed graph 100 of the roadway network 102. The set of nearby upstream links 124 for a node 122 may also include any non-null links 120 that can be connected to the node 122 by an unbroken sequence of null road links 118 (links with no reported speed) such that the total roadway length of the null links 118 is less than a specified numeric identifier, D. For example, D may be specified as 0.6 miles.

As noted above, FIG. 1 is a directed graph 100 of an exemplary roadway network 102 showing null links 118 and non-null links 120 and where nearby upstream links 124 for different nodes 122 are defined.

In the example of FIG. 1, relative to the node 122 identified as N1, and assuming D=0.6 miles, Link 9 is downstream of node N1, Link 2 is directly upstream of node N1, and the set of nearby upstream links 124 for node N1 is the set {Link 2, Link 3, and Link 7}. Link 6, Link 8, and Link 11 are non-null links 120 that are not nearby upstream to node N1, and Link 1, Link 4, Link 5, and Link 10 are null links 118 that are therefore also not nearby upstream to node N1.

Specifically, Link 2 is nearby upstream because it is directly upstream (i.e. connected to) node N1. Link 3 is nearby upstream because it is a non-null link 120 connected to node N1 by an unbroken sequence of null links 118, namely the sequence {Link 1}, whose total length 0.4 miles satisfies 0.4<D. Link 7 is nearby upstream because it is a non-null link 120 connected by node N1 by the following unbroken sequence of null links 118 {Link 4, Link 1}. The total length is 0.5 miles which satisfies 0.5<D. Link 6 and Link 8 are not nearby upstream because they cannot be connected to node N1 by a sequence of null links 118, because Link 2 is not a null link 118. Link 11 is not nearby upstream because the only sequence of null links 118 connecting it to node N1 is {Link 10, Link 4, Link 1}, for which the total length is 0.7 miles, which does not satisfy the condition 0.7<D.

In addition to being defined for a roadway node 122, "nearby upstream" is also defined in terms of a link 112, as follows. For a one-way directed graph link L that connects a Node A to a Node B, the present invention defines the set of nearby upstream links 124 of Link L as the set of nearby upstream links 124 of Node A.

These understandings of the term "nearby upstream" are all useful for the following process of detecting a bottleneck head 108, as they apply whenever the set of links 112 in the roadway network 102 that are "upstream" of a node 122 or link 112 is considered. In the bottleneck detection, classification and identification framework 140 according to the present invention, at each node 122 in the link-node roadway network 102, a bottleneck head condition 109 is detected where a reported speed on at least one nearby upstream link 124 is less than a speed X, and the reported speed on all downstream (outgoing) links 128 are greater than a speed Y plus the minimum reported speed of all nearby upstream links 124. In this analysis, speed X is the "congestion threshold speed" 130 and speed Y is the "bottleneck speed differential" 132.

For example, for roadways with a 65-mph speed limit, the speed might be X=40 mph, and the speed differential 132 might be Y=20 mph. This process is demonstrated in FIGS. 2-5, which illustrate the following examples. Values for X and Y are selected by, according to one possible embodiment, scaling them proportionally to the speed limit or observed "free flow speed" of each given road link 112, as discussed in further detail below.

Figure 2:
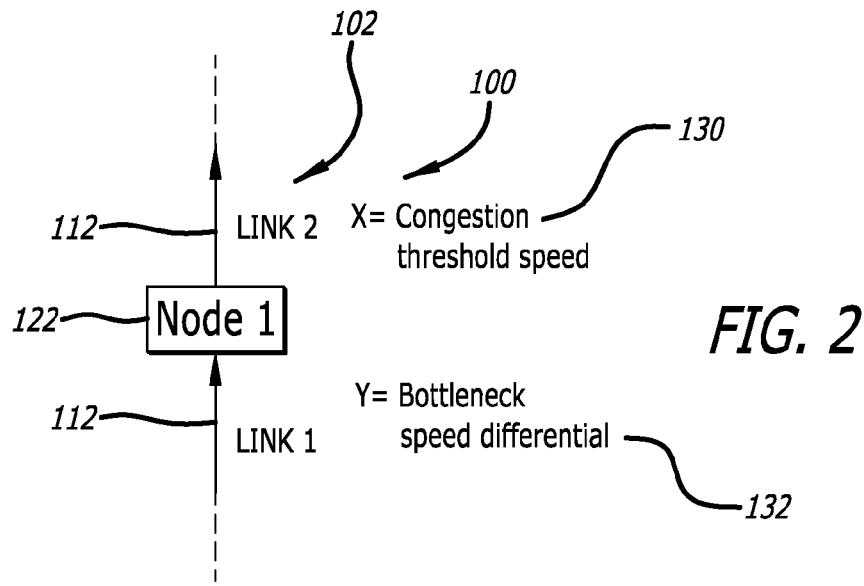
FIG. 2 is a graphically-illustrated example of bottleneck detection on a roadway network according to the present invention.

In FIG. 2, assume as noted above X=40 mph, Y=20 mph. If Link 1 is 35 mph and Link 2 is 65 mph, then a bottleneck 106 is detected at Node 1 because 35<X and 65−35>Y. Conversely, if Link 1 is 45 mph and Link 2 is 70 mph, a bottleneck 106 is not detected at Node 1 because while 70−45>Y, the other condition 45<X is not satisfied.

Figure 3:
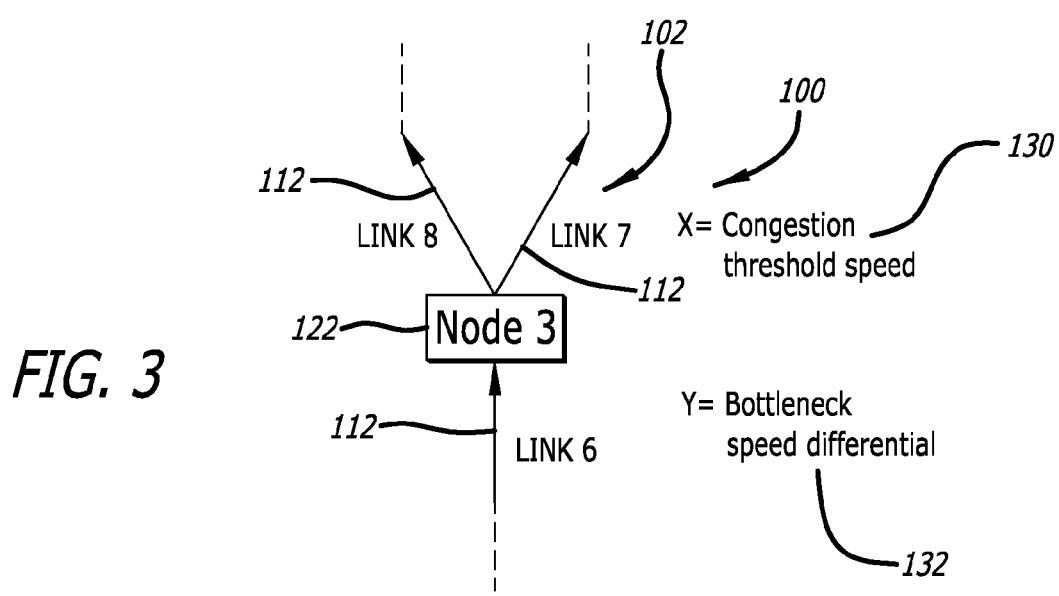
FIG. 3 is another graphically-illustrated example of bottleneck detection on a roadway network according to the present invention.

In FIG. 3 above, if Link 6 is 35 mph and Link 8 is 65 mph and Link 7 is 70 mph, then a bottleneck 106 is detected at Node 3 because 35 mph<X and both 65−35>Y and 70−35>Y. Conversely, if Link 6 is 35 mph and Link 8 is 50 mph and Link 7 is 65 mph, a bottleneck 106 is not detected at Node 3 because while 35<X and 65−35>Y, the remaining condition 50−35>Y is not satisfied.

Figure 4:
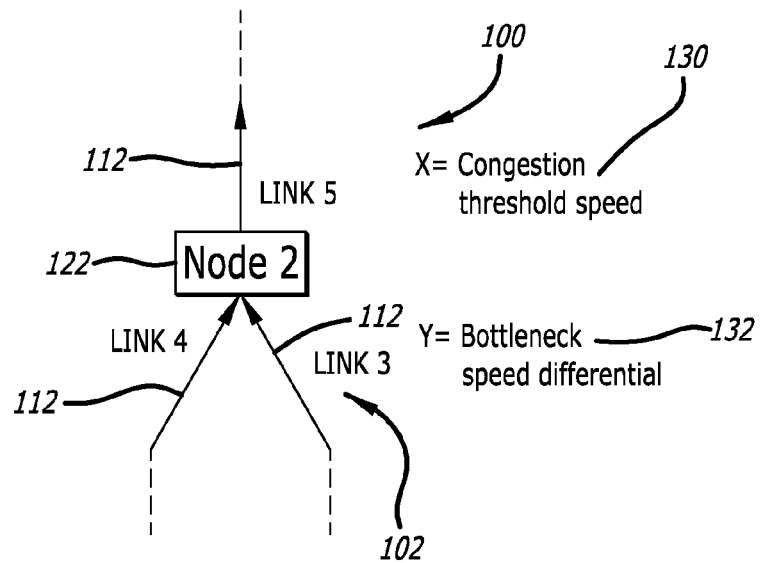
FIG. 4 is another graphically-illustrated example of bottleneck detection on a roadway network according to the present invention.

In FIG. 4 above, if Link 4 is 35 mph and Link 3 is 50 mph and Link 5 is 60 mph, then a bottleneck 106 is detected at Node 2 because at least one of the nearby upstream links 124 (Link 4, Link 3) satisfy the bottleneck head conditions 109 identified above, namely Link 4, because 35<X and 60−35>Y. However, if Link 4 is 20 mph and Link 3 is 25 mph and Link 5 is 35 mph, a bottleneck 106 is not detected, because while at least one of the nearby upstream links 124 (Link 4, Link 3) satisfies the first bottleneck head condition 109, e.g. Link 4 for which 25<X, neither of the nearby upstream links 124 meets the second bottleneck head condition 109 because neither 35−20>Y (for Link 4) nor 25−20>Y (for Link 3) is satisfied.

Figure 5:
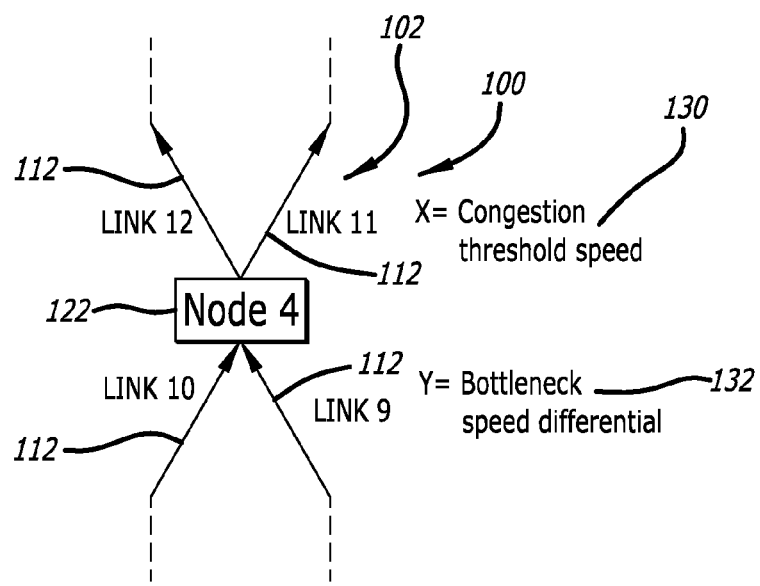
FIG. 5 is still another graphically-illustrated example of bottleneck detection on a roadway network according to the present invention.

In FIG. 5 above, if Link 10 is 30 mph and Link 9 is 65 mph and Link 12 is 55 mph and Link 11 is 60 mph, then a bottleneck 106 is detected at Node 4 because both bottleneck head conditions 109 are satisfied by at least one of the nearby upstream links 124 (Link 10, Link 9), namely Link 10 because 30<X and both 55−30>Y and 60−30>Y. However, if Link 10 is 30 mph and Link 9 is 65 mph and Link 12 is 55 mph and Link 11 is 45 mph, a bottleneck 106 is not detected because neither nearby upstream link 124 satisfies the two bottleneck head conditions 109, because while Link 10 satisfies the first bottleneck head condition 109, it does not satisfy the second bottleneck head condition 109 is not, since while 55−30>Y (for Link 12), the condition 45−30>Y (for Link 11) is not met.

In the directed graphs 100 depicted for each of the examples above, any of the directly upstream links (Links 1, 6, 4, 3, 10, and 9) may be replaced by a nearby upstream link 124 with one or more connecting null links 118 as defined above, with exactly the same results as described for each of these FIGS. 2-5.

The link-specific parameter values X and Y (reference numerals 130 and 132) for the analysis of the bottleneck head conditions (1) and (2) 109 as discussed above are chosen depending on certain properties of each roadway being analyzed. As noted above, one optimal method of assigning these parameter values 130 and 132 is to utilize roadway properties such as the typical or characteristic free-flow speed and/or the speed limit of the roadway. The present invention therefore may choose the parameter values 130 and 132 for X and Y from the speed limit or known characteristic/free-flow speed S by scaling those values linearly with that speed value for S, so that:

$$X=(S/65 \text{ mph})*40 \text{ mph}$$

$$Y=(S/65 \text{ mph})*20 \text{ mph}$$

The present invention further contemplates that wherever the parameter X 130 is compared to the speed S of any link 112, it is to be assumed that X may be chosen in a way specific to the link 112, such as the linearly-proportional method just described. Wherever the parameter Y 132 is used to compare the speed differential between two links L1 and L2, it is to be assumed that the value of Y is one of the values Y1 or Y2 that may be chosen specific to L1 or L2 according to some method such as the one described above. Whether Y1 or Y2 is used in the comparison should be chosen according to a consistent rule, such as use the larger of Y1 or Y2, or use Y1 or Y2 according to which of the links L1 or L2 is downstream of the other, or use Y1 or Y2 according to which of the links L1 or L2 is upstream of the other.

Figure 6:
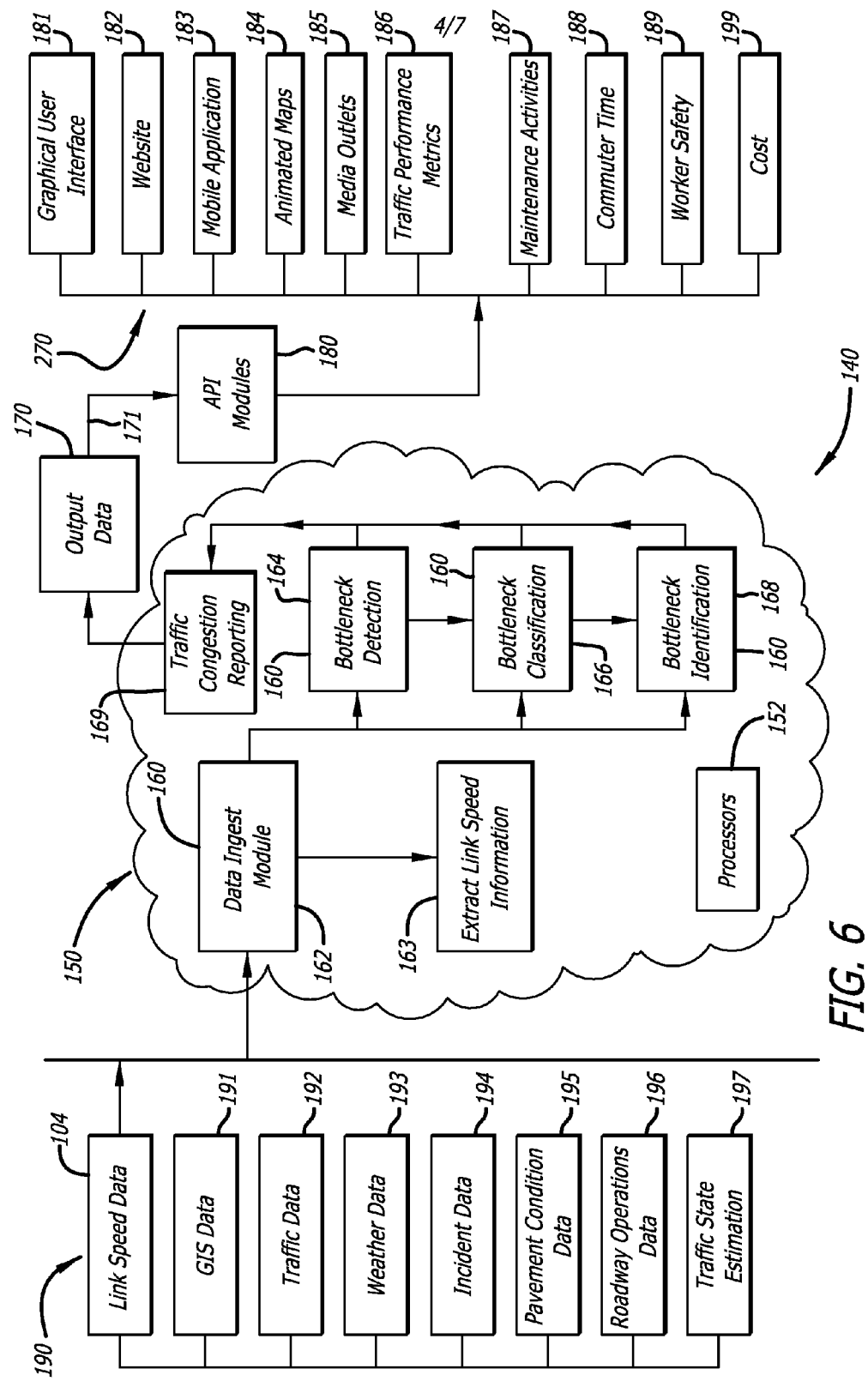
FIG. 6 is a block diagram of a system and method of bottleneck detection, classification and identification according to the present invention.

Bottleneck detection, classification, and identification 140 in the present invention is comprised of, in one aspect thereof, software and hardware components, such as one or more processors 152, configured to execute program instructions in one or more data processing modules 160 to perform the processing of link-speed data 104 as described herein. Also included is a data ingest module 162 configured to receive a plurality of input data 190 from many different sources of such link-speed data 104, and this input data 190 may include many different types of data that are further processed to generate link-speed data 104, from which the present invention models traffic conditions over the specified periods of time, as noted further herein, to produce traffic congestion data 171 as output data 170. The data ingest module 162 may therefore perform an extraction 163 of link-speed data 104 from the various types of input data 190 ingested into the present invention. The software and hardware components, program instructions, and one or more data processing modules 160 may be portions of a broader computing environment 150 configured to perform the bottleneck detection, classification, and identification 140 of the present invention. FIG. 6 is a systemic diagram of a framework for bottleneck detection, classification, and identification 140 according to the present invention.

The one or more data processing modules 160 may further include modules for performing the various activities within the framework for bottleneck detection, classification, and identification 140 of the present invention. These may include a detection module 164, a classification module 166, and an identification module 168.

The present invention may further include a traffic congestion reporting module 169, which may generate, as output data 170 from the one or more data processing modules 160, information to be used by public or private entities responsible for managing a transportation infrastructure and roadway network 102, and this output data 170 may be configured in many different ways, depending on the intended use. Output data 170 may be in the form of traffic congestion data 171 for the roadway network 102 being modeled, and may be further configured for display generally on a graphical user interface 181 or for distribution and/or display with third party platforms, such as for display on a website 182, via a mobile application 183, or via animated maps 184 or other visualized display by entities such as media outlets 185. The output data 170 and traffic congestion data 171 may be further distributed to public or private entities responsible for roadway maintenance 187 or roadway safety 189. The output data 170 and traffic congestion data 171 may be further applied to one or more application programming interface modules 180 for display or distribution of the output data 170 as noted above.

Once a bottleneck head 106 has been detected using the process above of the bottleneck detection, classification and identification framework 140, the present invention detects a bottleneck queue 110 by moving upstream along the directed graph 100 of the roadway network 102 to discover the extent of the queue 110, by including all links 112 with reported speed <X. When there are multiple nearby upstream links 124, all links 112 are checked for speed <X. This is performed at least in part by the detection module 164.

Initially the bottleneck queue 110 includes all nearby upstream links 124 that satisfied the two bottleneck head conditions 109 in the process above for the detection of a bottleneck head 108. Specifically, the initial bottleneck queue 110 includes all nearby upstream links 124 whose speed S satisfies:

(a) S<X, and
(b) F−S>Y, for all (F), where (F) is the set of reported speeds for links downstream of the bottleneck head 108 node.

The present invention proceeds by growing the bottleneck queue 110 according the following procedure. Consider the set of all links 112 that are nearby upstream of any of the non-null links 120 already in the bottleneck queue 110, according to the definition of "nearby upstream" given above. For each such nearby upstream link L 124, where L is already in the bottleneck queue 110, no action is taken. However, if the reported speed S of link L satisfies S<X, then the link L is added to the bottleneck queue 110. If the newly-added nearby upstream link L 124 was not immediately upstream (i.e. connected to the bottleneck head node 203), then the sequence of null links (NL1, NL2, . . . ) 120 by which L is connected to one (or more) of the links 112 already in the bottleneck queue 110 is added thereto.

The present invention then iteratively grows the bottleneck queue 110 by examining the next set of nearby upstream links 124 to links 112 already in the queue 110, identified by the bottleneck head condition 109 process above. The iterations end when the queue 110 no longer grows any larger. The result is a set of non-null links 120, and possibly connecting sequences of null links 118, comprising the fully-detected queue 110 of the bottleneck 108.

Figure 7:
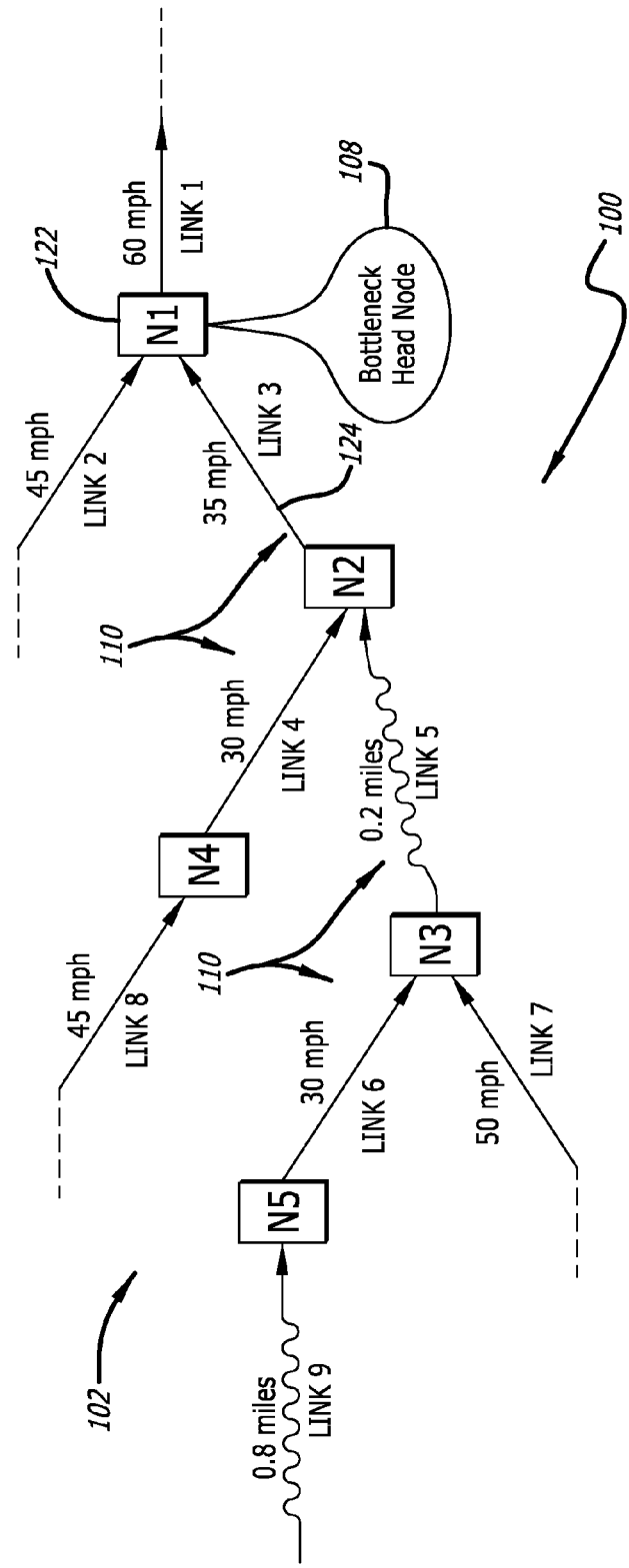
FIG. 7 is a graphical illustration of an exemplary iterative approach to detecting a bottleneck queue according to the present invention.
Figure 7:
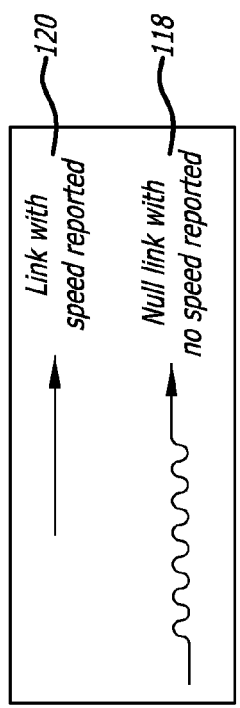

FIG. 7 illustrates one example of this iterative approach to detecting the bottleneck queue 110 according to the present invention. In this example, the null-link 120 maximum distance is D=0.6 miles, and X=40 mph, and Y=20 mph.

In FIG. 6, the node N1 122 is detected as a bottleneck head node 203 because its upstream link L3 satisfies the conditions (a) and (b) above, because 35<X and 60−35>Y. For this bottleneck head node 203, the queue 110 detection approach proceeds as follows. Initially, the nearby upstream link L3 124 is in the bottleneck queue 110, and link L2 is not in the queue 110 because it does not satisfy 45<X (it also fails to satisfy 60−45>Y). In the first iteration of the approach, the queue 110 is {L3} and so the following nearby upstream links 124 of links 112 in the queue 110 are considered: {L4, L6, L7}.

The reported speed of L4 satisfies the queue condition 30<X, so it is added to the queue 110. The reported speed of L6 also satisfies the queue condition 30<X, so both L6 and the connecting sequence of null links {L5} 118 are added to the queue 110. The reported speed of L7 does not satisfy the queue condition 50<X, so it is not added to the queue 110. The bottleneck queue 110 after the first iteration therefore consists of the links {L3, L4, L5, L6}.

In the second iteration of this bottleneck queue 110 approach of the present invention, the following nearby upstream links 124 of links 112 already in the queue 110 are considered: {L8, L7}. The null link L9 118 does not satisfy the condition 0.8<D, so there are no nearby upstream links 124 of the link L6. The reported speed of L8 does not satisfy the queue condition 45<X, so it is not added to the queue 110. The reported speed of L7 does not satisfy the queue condition 50<X, so it is not added to the queue 110. It is to be understood that, in an optimized implementation, the repeated redundant checking of links 112 such as L7 will only be performed once.

After the second iteration of the algorithm, the bottleneck queue 110 has not changed, so the process terminates. The final bottleneck queue 110 in this example is therefore the set of links {L3, L4, L5, L6}.

In another embodiment of the present invention, a system and method of detecting traffic bottlenecks 106 on a roadway network 102 using link-speed data 104 includes classifying each bottleneck 106 to provide an indication to organizations responsible for managing a transportation infrastructure network as to locations on a roadway network 102 that should be investigated as the cause of upstream congestion. More specifically, traffic conditions at or near the head 108 of a bottleneck 106 may be the cause of the congested bottleneck queue 110, and therefore categorization of the queues 110 of bottlenecks 106 as detected according to the processes above indicates whether the congestion in each bottleneck queue 110 can be hypothesized as being solely or mainly caused by conditions at the corresponding bottleneck head location 210. This is performed at least in part by the classification module 166.

A tail node 202 of a bottleneck queue 110 is defined as any node N 122 such that 1) the bottleneck queue 110 contains at least one link 112 that is immediately downstream of (i.e. connected to and directed out of) node N, and 2) the bottleneck queue 110 contains no links 112 that are immediately upstream of node N. Every bottleneck queue 110 will have at least one tail node 202.

A linear bottleneck 204 is a bottleneck 106 with exactly one bottleneck head node 203, and exactly one bottleneck tail node 202, and that is not part of any bottleneck complex 206 (defined further below). A linear bottleneck 204 may lie entirely on a single named roadway, or it may lie on two or more named roadways. A linear bottleneck 204 may be investigated beginning with the hypothesis that all or most of the congestion in the bottleneck queue 110 is attributable to the road conditions at or near the bottleneck 106 point.

A nonlinear bottleneck 205 is a bottleneck 106 with exactly one bottleneck head node 203, and more than one bottleneck tail node 202, and that is not part of any bottleneck complex 206. A nonlinear bottleneck 205 will normally lie on more than one named roadway. A nonlinear bottleneck 205 may be investigated beginning with the hypothesis that all or most of the congestion in the bottleneck queue 110 is attributable to the road conditions at or near the point of the bottleneck 106.

Figure 8:
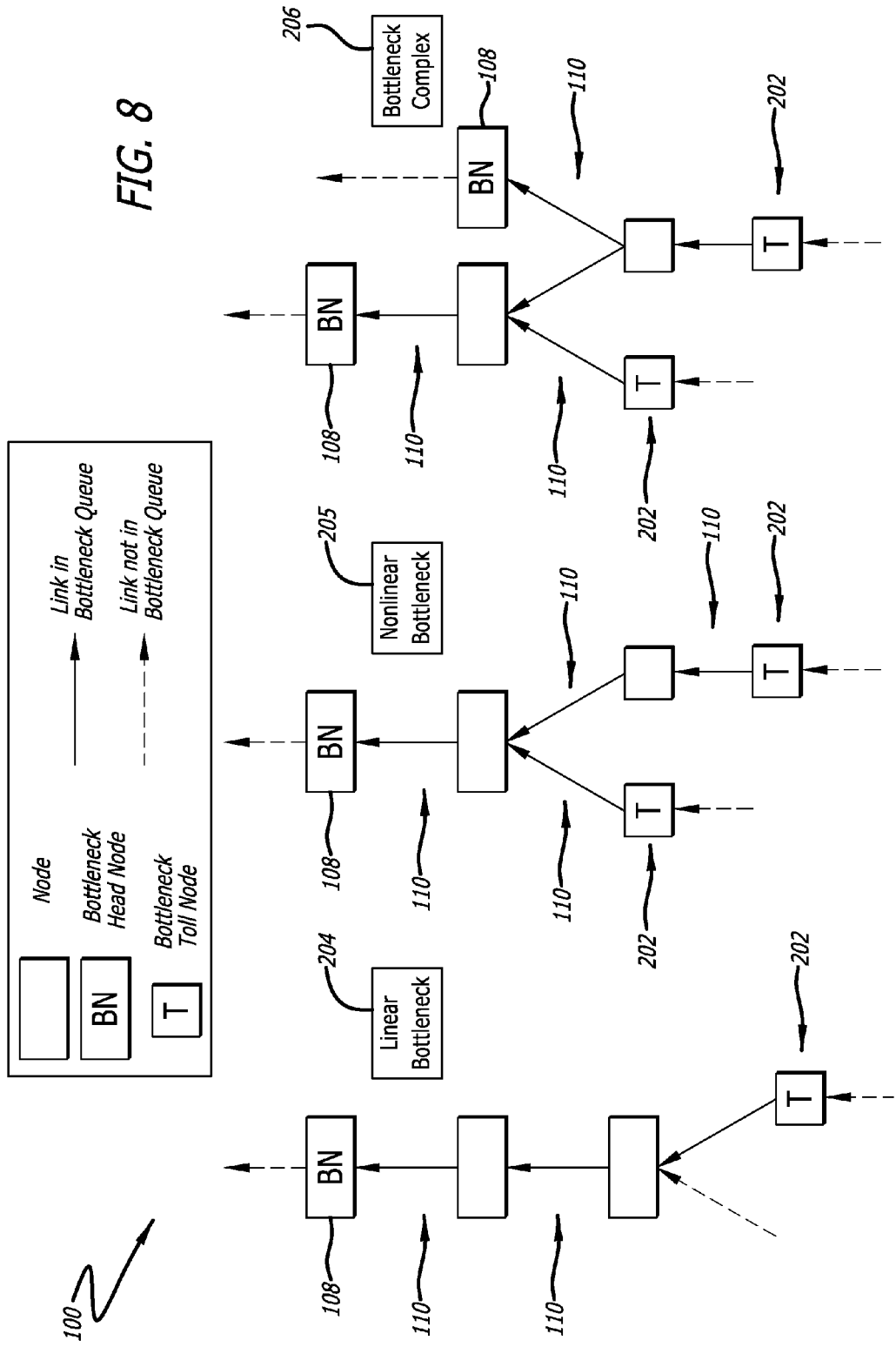
FIG. 8 is a graphical illustration of bottleneck categories.

A bottleneck complex 206 is any maximal set of two or more bottlenecks 106 in which the queue 110 of each bottleneck 106 in the set shares one or more links 112 with the queue 110 of one or more of the other bottlenecks 106 in the set. The set is maximal if no other detected bottlenecks 106 could be added to the set while still satisfying the condition above. A bottleneck complex 206 necessarily has two or more bottleneck head nodes 203, and has one or more bottleneck tail nodes 202. A bottleneck complex 206 cannot be investigated beginning with the hypothesis that all or most congestion in the bottleneck queue 110 is attributable to road conditions at or near any single one of the bottleneck head 108 points, because there are multiple bottleneck head 108 points. FIG. 8 is a graphical illustration of these categories.

Classification of traffic bottlenecks 106 in this manner (linear bottleneck 204, non-linear bottleneck 205, and bottleneck complex 206) is useful for organizations managing a transportation network infrastructure in many ways. Such organizations may be interested, for example, in identifying regions where local road conditions, possibly in conjunction with other factors such as special events or weather, might be causing congestion upstream of a bottleneck 106. Attempts to mitigate conditions causing the bottleneck 106 may also be measured by the analytics applied to traffic performance metrics 186 described above using traffic congestion data 171.

As noted above, the present invention therefore generates output data 170 representative of traffic conditions that serves as a valuable tool for management organizations to make appropriate decisions concerning a roadway network 102. For example, resultant outcomes of processing link-speed data 104 in the bottleneck detection, classification and identification framework 140 described herein allow such organizations to determine which links or segments of a roadway network 102 are potentially problematic, based on a variety of different factors, such as time, weather, events, etc. The resultant outcomes may also assist in differentiating between alternate hypotheses for existing road conditions. As an additional example, it may be the case that one hypothesis about road conditions is considered for recurring "linear bottlenecks" 204 and "nonlinear bottlenecks", 205 and a different hypothesis is considered for recurring "bottleneck complexes" 206. The present invention provides a system and method for distinguishing between such hypotheses to enable transportation infrastructure management to better address conditions in an appropriate, time-sensitive manner.

Another possible use of bottleneck classification in the present invention is to identify early (within, say, 15-30 minutes) when a recurring bottleneck 208 may be beginning ("the weekday bottleneck at location X is starting at the usual time") and then apply knowledge of a set of identified, recurrent sustained bottlenecks 208 as described below for follow-on predictive traffic modeling. For example, the set of identified, recurrent sustained bottlenecks 208 may be used to predict the duration of the bottleneck, and/or predict the occurrence or non-occurrence of other recurring bottlenecks on that same day. This information is useful as traffic performance metrics 186 to both transportation infrastructure management entities and for commuters. One follow-on predictive use of the present invention is to model the conduct and impact of maintenance activities 187 performed on roadways in conjunction with known speed conditions, which may generate resultant improvements in commuter time 188, worker safety 189, and costs 199 for such maintenance activities 187.

In another embodiment of the present invention, a system and method of tracking traffic bottlenecks on a roadway network 102 analyzes link-speed data 104 to identify bottlenecks 106 occurring at different times or on different days as part of the same recurring bottleneck 208, where there is an identical or similar bottleneck head location 210. Identification of recurrent bottlenecks 208 is an important traffic congestion management tool, as these have been established as containing the most congestion, and consequently, the highest number of lost hours of commuter or traveler delay.

Depending on the cause of a bottleneck 106, the bottleneck head location 210 may move from minute-to-minute, hour-to-hour, or day-to-day. For example, traffic may be congested due to conditions on several consecutive freeway entrances or exits, such that when the congestion on one such entrance/exit begins or clears, either permanently or temporarily, the bottleneck head location 210 may correspondingly move upstream or downstream. In another example, construction may occur along a roadway at different locations on different times or days. Regardless of the cause of changes in the bottleneck head location 210, it is useful for organizations managing a roadway network 102 to be able to detect and aggregate such collections of nearby detected bottlenecks 106, as they may have an identifiable common cause.

In this embodiment, the present invention proceeds by tracking recurrent bottlenecks 208 by first defining conditions for similar bottlenecks 106. A bottleneck BN1, which is one of the detected bottlenecks 106 for link-speed data 104 from one time period T1, and a bottleneck BN2, which is one of the set of detected bottlenecks 106 for link-speed data 104 from a different time period T2, are similar bottlenecks 106 if (1)

neither BN1 nor BN2 are in any bottleneck complex 206 as defined above; 2) either the bottleneck head node 203 of BN1 lies within the queue 110 of BN2, or the bottleneck head node 203 of BN2 lies within the queue 110 of BN1; 3) no other bottleneck 106 from the set of detected bottlenecks 106 for link-speed data 104 from the time period T1 satisfies conditions (1) and (2) above with BN2; and 4) no other bottleneck 106 from the set of detected bottlenecks 106 for link-speed data 104 from the time period T2 satisfies conditions (1) and (2) above with BN1.

A node N 122 is defined as lying within a bottleneck queue 110 if one of the links 112 in the bottleneck queue 110 has node N 122 as its end-node. In another implementation, or as a parameter to this process, the definition of a node 122 "lying within" a bottleneck queue 110 can be extended to include the start-node as well as the end-node of links 112 in the bottleneck queue 110. With this change, more bottlenecks 106 will be defined as similar to each other. In still another implementation, the linear roadway distance between the bottleneck head node 203 of BN1 and the bottleneck head node 203 of BN2, along links lying in either the queue 110 of BN1 or the queue 110 of BN2, may be additionally restricted to be less than a certain value M, such as M=2 miles. When this condition is not satisfied, the bottlenecks 106 are not similar. Note that two bottlenecks 106 with an identical head location 210 also be similar bottlenecks 106 according to this definition. In yet another implementation, bottlenecks BN1 and BN2 106 may be defined to be similar when their respective queues 110 have any roadway links 112 in common with each other, and not in common with any other bottlenecks 106.

The present invention then analyzes link-speed data 104 from a sequence of time periods (such as one set of link-speed data every 5 minutes). This link-speed data 104 may be either in real-time and/or reflective of current conditions as the data becomes available, or all at once using input data 190 from a historical database, to obtain persistent bottleneck sets 209 from conditions defined for similar bottlenecks occurring on identical or nearby locations on the roadway network 102, over specified time-period sequence.

During the nth time period, for each detected bottleneck BN1, if there exists a similar bottleneck BN2 from the previous time period (n−1), and neither BN1 nor BN2 is a part of any bottleneck complex 206 as defined above, and if BN2 is part of a persistent bottleneck set 209 then BN1 is also similar to all other bottlenecks 106 in the set, then group BN1 and BN2 into the same persistent bottleneck set 209. If no similar bottleneck 106 is found in the previous time period (n−1), then these steps are repeated for earlier time periods beginning with n−2, n−3, etc., up to a defined limit. For example, with 5-minute time periods, the limit might be n−3, corresponding to 15 minutes. The result of the above process is a set of persistent bottlenecks 209 occurring on identical or nearby locations on the roadway network 102, over a range of time periods, possibly with gaps.

Figure 9:
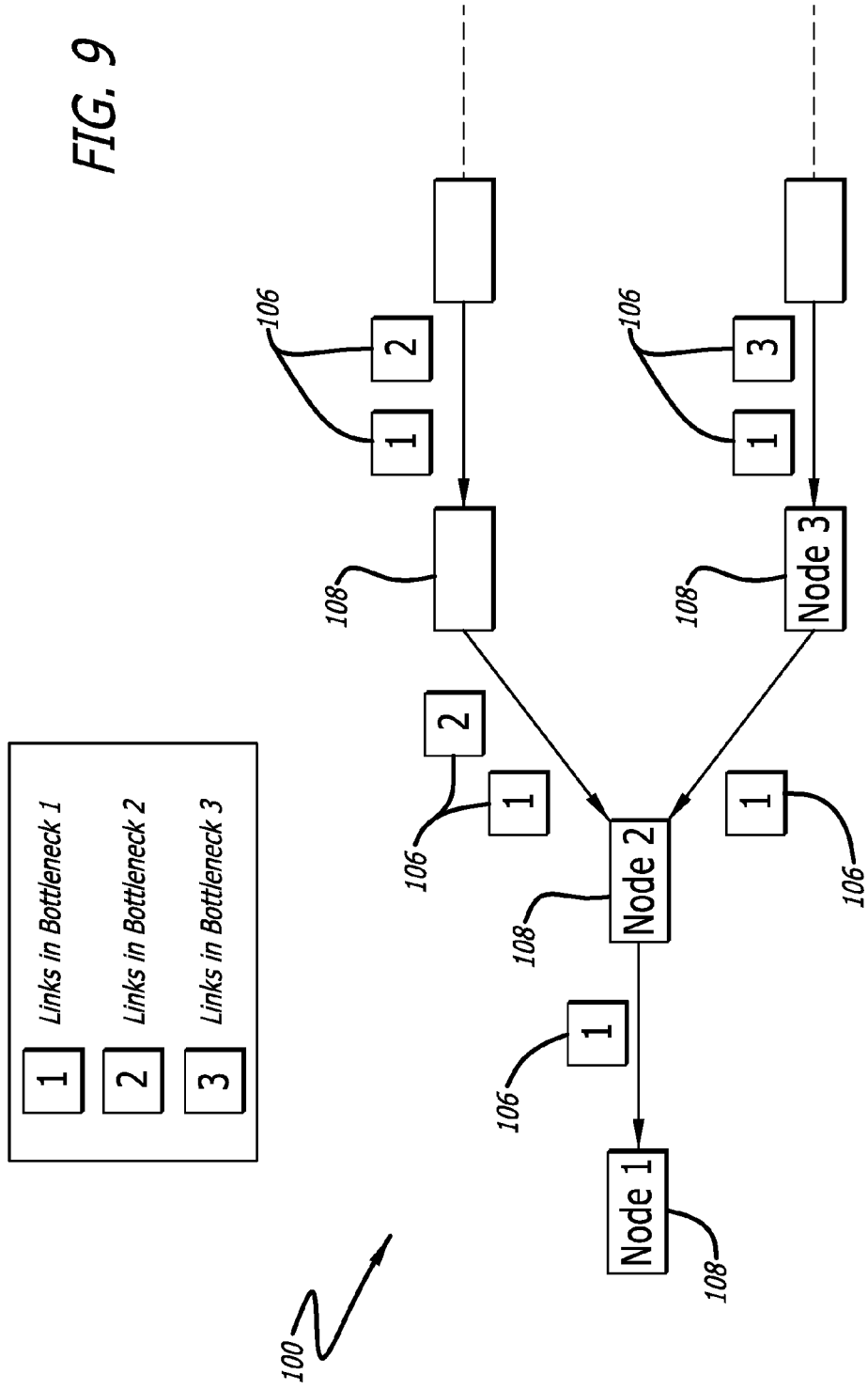
FIG. 9 is graphically-illustrated example of identifying persistent and recurrent bottlenecks.

In the example of FIG. 9, bottleneck BN1 consists of 5 links with bottleneck head node N1, bottleneck BN2 consists of 2 links with head node N2, and bottleneck BN3 consists of 1 link with head node N3. Assume that no bottlenecks 106 are part of any bottleneck complex 206. BN1 is similar to BN2, because the head node N2 of BN2 lies within the queue 110 of BN1. BN1 is also similar to BN3, because the head node N3 of BN3 lies within the queue 110 of BN1. Finally, BN2 is not similar to BN3 because the head node N2 of BN2 does not lie within the queue 110 of BN3, and the head node N3 of BN3 does not lie within the queue 110 of BN2.

In FIG. 9, persistent bottleneck sets 209 are identified as follows. If BN1 is detected in period n=1, and BN2 is detected in the time period n=2, and BN3 is detected in time period n=3, then after time period n=2, bottlenecks BN1 and BN2 are grouped into a persistent bottleneck set 209 {BN1, BN2}, because they are similar. After time period n=3, bottleneck BN3 is not grouped into the same persistent bottleneck set 209, because there is a member of the set to which BN3 is not similar, namely, BN1. If BN1 is detected in time period n=1, and BN2 and BN3 are both detected in time period n=2, then after time period n=2, no bottlenecks 106 are grouped into a persistent bottleneck set 209, because, while both BN2 and BN3 satisfy conditions (1) and (2) for similarity as described above, they both fail condition (4).

The set of persistent bottlenecks 209 can be further analyzed many different ways. For example, sustained bottlenecks 106 may be identified as those persistent bottleneck sets 209 that persist for a specified amount of time, such as 25 minutes or longer, allowing for gaps of up to 10 minutes in any given greater time period of persistence.

To compare persistent bottlenecks 209 to each other across some period of time, such as multiple days, for identification of recurrent bottlenecks 208, similarity between bottlenecks 106 can be extended so as to apply to persistent bottleneck sets 209 across that period of time. For example, persistent bottleneck P, consisting of bottlenecks {P1, P2, . . . } is similar to another persistent bottleneck Q, consisting of bottlenecks {Q1, Q2, . . . }, if all the bottlenecks P1, P2 . . . are similar to all the bottlenecks Q1, Q2, . . . etc. It is to be understood that this aspect of the present invention shall not be limited to days, and may indeed refer to other aggregated time periods of interest, such as weeks, months, etc., time windows such as 6-hour, 8-hour, or 12-hour windows, etc. Denoted "peak" and/or "off-peak" time periods or "shifts" may also be compared, such as AM/morning peak (e.g. 5 am to 10 am), PM/evening peak (e.g. 3 pm to 8 pm), and noon-time shift (e.g. 10 am to 3 pm). Accordingly, persistent bottlenecks 209 may be compared across any time period of interest, and the present invention is not intended to be limited to any particular period of time for comparison.

Many measures of the spatial and temporal extent of traffic bottlenecks 106 may be obtained using this embodiment of the present invention. For example, for individual bottlenecks 106 in a single time period, it is possible to ascertain the total length in miles or kilometers of all links 112 in a bottleneck queue 110.

For persistent bottleneck sets 209, it is possible to ascertain metrics over an observed time period, such as the median, mean, maximum values, etc., of the duration, total length, and spatio-temporal extent. One may determine the duration by multiplying the number of time periods persistently detected by the length of each time period. Alternatively, instead of being persistently detected, the time period may be a customary derived quantity such as a "sustained time" as described above. The present invention enables observation of an integrated spatio-temporal extent (for example, minute-miles), determined by the sum of bottleneck 106 duration multiplied by the total length over all observed time periods.

For recurring persistent bottleneck sets 209, it is possible to ascertain the number or fraction of days (in a given period, such as a month) that the persistent bottleneck 209 occurred. Additionally, as with persistent bottleneck sets 209 as described above, metrics such as the total, median, mean, maximum, etc. may be obtained for each of the spatial or temporal measures above, such as the duration (minutes), total length (miles/kilometers), and integrated spatio-temporal extent (minute-miles).

The systems and methods of the various embodiments of the present invention may be implemented in many different computing environments. For example, they may be implemented in conjunction with a special purpose computer, a programmed microprocessor or microcontroller and peripheral integrated circuit element(s), an ASIC or other integrated circuit, a digital signal processor, electronic or logic circuitry such as discrete element circuit, a programmable logic device or gate array such as a PLD, PLA, FPGA, PAL, and any comparable means. In general, any means of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other such hardware. Some of these devices include processors (e.g., a single or multiple microprocessors), memory, nonvolatile storage, input devices, and output devices. Furthermore, alternative software implementations including, but not limited to, distributed processing, parallel processing, or virtual machine processing can also be configured to perform the methods described herein.

The systems and methods of the present invention may also be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Additionally, the data processing functions disclosed herein may be performed by one or more program instructions stored in or executed by such memory, and further may be performed by one or more modules configured to carry out those program instructions. Modules are intended to refer to any known or later developed hardware, software, firmware, artificial intelligence, fuzzy logic, expert system or combination of hardware and software that is capable of performing the data processing functionality described herein.

The foregoing descriptions of embodiments of the present invention have been presented for the purposes of illustration and description. It is not intended to be exhaustive or to limit the invention to the precise forms disclosed. Accordingly, many alterations, modifications and variations are possible in light of the above teachings, may be made by those having ordinary skill in the art without departing from the spirit and scope of the invention. It is therefore intended that the scope of the invention be limited not by this detailed description. For example, notwithstanding the fact that the elements of a claim are set forth below in a certain combination, it must be expressly understood that the invention includes other combinations of fewer, more or different elements, which are disclosed in above even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a sub-combination or variation of a sub-combination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what essentially incorporates the essential idea of the invention.

The invention claimed is:

1. A method of analyzing traffic congestion, comprising:
   within a computing environment comprised of a computer processor and at least one non-transitory computer-readable storage medium operably coupled to the computer processor and having program instructions stored therein, the computer processor being operable to execute the program instructions to perform the steps of:
   assigning, for a roadway network represented as a directed graph in which a plurality of link-nodes connect links downstream from each node and upstream from each node, a first condition in which a vehicular speed on at least one nearby upstream link is less than a congestion threshold speed, and a second condition in which a vehicular speed on all downstream links are greater than a bottleneck speed differential plus a minimum vehicular speed of all nearby upstream links;
   detecting a bottleneck head condition at a particular node where the first condition and the second condition are both satisfied;
   detecting at least one bottleneck queue by initially identifying all nearby upstream links satisfying the first condition and the second condition, and including all nearby upstream links whose vehicular speed is greater than the congestion threshold speed and, for a set of vehicular speeds for links downstream of a bottleneck head node, all nearby upstream links where the set of vehicular speeds less the vehicular speed is greater than the bottleneck speed differential; and
   analyzing all links that are nearby upstream of any of links already in the at least one bottleneck queue to iteratively expand each bottleneck queue, so that if the vehicular speed of a link is greater than the congestion threshold speed, then the link is added to a bottleneck queue.

2. The method of claim 1, wherein an upstream link is defined for each link-node to include all immediately-connected non-null upstream nodes within the directed graph, and wherein links for which there is no vehicular speed in a given time period are defined as null links, and wherein road links that do have vehicular speeds are defined as non-null links.

3. The method of claim 1, wherein the congestion threshold speed and the bottleneck differential speed are derived by a proportional scaling relative to at least one of a speed limit or an observed free flow speed for each link comprising the roadway network.

4. The method of claim 1, wherein the vehicular speed is link-speed data representative of speed information for one or more links in the roadway network for each of several time periods.

5. The method of claim 4, wherein the link-speed data is derived from one or more of traffic data, weather data, incident data, pavement condition data, roadway operations data, and data generated by one or more integrated traffic state estimation systems.

6. The method of claim 2, wherein if a newly-added nearby upstream link is not immediately upstream so as to be connected to the bottleneck head node, then the sequence of null links by which the link is connected to one or more of the links already in the bottleneck queue is also added to the bottleneck queue.

7. The method of claim 1, further comprising:
identifying an existence of one or more bottleneck head nodes and one or more bottleneck tail nodes in each bottleneck queue; and
classifying the at least one bottleneck queue according to a shape of each queue, the shape of each queue categorized based upon a number of bottleneck head nodes and a number of bottleneck tail nodes, each bottleneck queue classified as either a linear bottleneck, a non-linear bottleneck, or a bottleneck complex to indicate whether congestion in each bottleneck queue can be hypothesized as being solely or mainly caused by conditions at the corresponding bottleneck head location.

8. The method of claim 7, wherein a linear bottleneck is a bottleneck with exactly one bottleneck head node, and exactly one bottleneck tail node, and that is not part of any bottleneck complex.

9. The method of claim 7, wherein a nonlinear bottleneck is a bottleneck with exactly one bottleneck head node, and more than one bottleneck tail node, and that is not part of any bottleneck complex.

10. The method of claim 7, wherein a bottleneck complex is any maximal set of two or more bottlenecks in which the queue of each bottleneck in the maximal set shares one or more links with the queue of one or more of the other bottlenecks in the maximal set, and wherein a bottleneck complex has two or more bottleneck head nodes, and has one or more bottleneck tail nodes.

11. The method of claim 1, further comprising:
tracking the at least one bottleneck queue on the roadway network by analyzing the vehicular speed to recognize bottlenecks occurring at different times or on different days as part of a common recurring bottleneck, by:
defining conditions for similar bottlenecks, wherein a first bottleneck comprised of a set of detected bottlenecks for vehicular speed from a first time period and a second bottleneck comprised of a set of detected bottlenecks for vehicular speed from a second time period are similar if 1) neither of the first or second bottlenecks are in any bottleneck complex, 2) either a bottleneck head node of the first bottleneck lies within a queue of the second bottleneck, or a bottleneck head node of the second bottleneck lies within a queue of the first bottleneck, 3) no other bottleneck from the set of detected bottlenecks for vehicular speed from the first time period satisfies (1) and (2) with the second bottleneck, and 4) no other bottleneck from the set of detected bottlenecks for vehicular speed from the second time period satisfies (1) and (2) with the first bottleneck;
identifying persistent bottleneck sets from the conditions defined for the similar bottlenecks occurring on identical or nearby locations on the roadway network over a range of time periods by analyzing vehicular speed over a specified time-period sequence, wherein during an nth time period, for each detected bottleneck, if there exists a similar bottleneck from the previous time period (n−1), and neither of the bottlenecks is a part of any bottleneck complex, and if the similar bottleneck is part of a persistent bottleneck set, then the similar bottleneck is also similar to all other bottlenecks in the set, then group the bottlenecks into the same persistent bottleneck set, and proceeding with preceding time periods up to a defined limit; and
comparing persistent bottlenecks to each other across a specific period of time to identify recurrent bottlenecks by extending a similarity between that bottlenecks to apply to persistent bottleneck sets across that specific period of time.

12. The method of claim 11, further comprising developing a plurality of spatial and temporal values to measure an extent of the recurrent bottlenecks over an observed time period, the plurality of spatial and temporal values including median, mean, and maximum values of the duration, total length, and spatio-temporal extent minutes-per-mile of a particular recurrent bottleneck.

13. The method of claim 11, further comprising developing a plurality of traffic performance metrics from the persistent bottleneck sets, the traffic performance metrics including prediction of bottleneck duration, prediction of recurring bottlenecks on the same day, and modeling of conduct and impact of maintenance activities performed on links in the roadway network in conjunction with known speed conditions to improve one or more of commuter time, worker safety, and cost management.

14. A system comprising:
a plurality of input data including link-speed data representative of vehicular speed data for one or more links in a roadway network for each of several time periods, and link-node data reflective of the roadway network as a directed graph, in which a plurality of link-nodes connect links downstream from each node and upstream from each node;
a plurality of data processing modules, executed within a computing environment by at least one computer processor and at least one non-transitory computer-readable storage medium operably coupled to the at least one computer processor, the computer processor being operable to analyze traffic congestion conditions within the plurality of data processing modules, the plurality of data processing modules including:
a bottleneck detection module configured to detect a bottleneck head condition and at least one bottleneck queue;
a bottleneck classification module configured to classify the one or more bottleneck queues according to a shape of each queue;
a bottleneck identification module configured to recognize bottlenecks occurring at different times or on different days as part of a common recurring bottleneck to identify persistent bottleneck sets and recurrent bottlenecks;

a traffic congestion reporting module configured to generate output data representative of traffic congestion information for the roadway network.

15. The system of claim 14, wherein the link-speed data is derived from one or more of traffic data, weather data, incident data, pavement condition data, roadway operations data, and data generated by one or more integrated traffic state estimation systems.

16. The system of claim 14, wherein the bottleneck detection module detects a bottleneck head condition at a particular node where a first condition in which vehicular speed on at least one nearby upstream link is less than a congestion threshold speed, and a second condition in which vehicular speed on all downstream links are greater than a bottleneck speed differential plus a minimum vehicular speed of all nearby upstream links, are both satisfied, and detects at least one bottleneck queue by initially identifying all nearby upstream links satisfying the first condition and the second condition, and including all nearby upstream links whose vehicular speed is greater than the congestion threshold speed and, for a set of vehicular speeds for links downstream of a bottleneck head node, all nearby upstream links where the set of reported speeds less the reported vehicular speed is greater than the bottleneck differential speed.

17. The system of claim 14, wherein the shape of each queue is categorized based upon a number of bottleneck head nodes and a number of bottleneck tail nodes, each bottleneck queue classified as either a linear bottleneck, a non-linear bottleneck, or a bottleneck complex to indicate whether congestion in each bottleneck queue can be hypothesized as being solely or mainly caused by conditions at the corresponding bottleneck head location.

18. The system of claim 14, wherein the input data is analyzed to recognize bottlenecks occurring at different times or on different days as part of a common recurring bottleneck, and persistent bottleneck sets are identified from conditions defined for the similar bottlenecks occurring on identical or nearby locations on the roadway network over a range of time periods by evaluating the link-speed data over a specified time-period sequence.

19. The system of claim 18, wherein the bottleneck classification compares persistent bottlenecks across a specific period of time to identify recurrent bottlenecks by extending a similarity between bottlenecks to apply to persistent bottleneck sets across that specific period of time.

20. The system of claim 14, wherein the output data enables development of a plurality of traffic performance metrics, the traffic performance metrics including prediction of bottleneck duration, prediction of recurring bottlenecks on the same day, and modeling of conduct and impact of maintenance activities performed on links in the roadway network in conjunction with known speed conditions to improve one or more of commuter time, worker safety, and cost management.

21. A method of analyzing traffic congestion, comprising:
    ingesting, as input data, link-speed data derived from one or more of traffic data, weather data, incident data, pavement condition data, roadway operations data, and data generated by one or more integrated traffic state estimation systems, the link-speed data indicative of vehicular speed data for one or more links in the roadway network for each of several time periods;
    modeling the input data in a plurality of data processing modules within a computing environment in which the plurality of data processing modules are executed in conjunction with at least one processor, the data processing modules configured to analyze traffic congestion conditions by
    1) detecting a bottleneck head condition at a particular node where a first condition in which vehicular speed on at least one nearby upstream link is less than a congestion threshold speed, and a second condition in which vehicular speed on all downstream links are greater than a bottleneck speed differential plus a minimum vehicular speed of all nearby upstream links, are both satisfied, and detecting at least one bottleneck queue by initially identifying all nearby upstream links satisfying the first condition and the second condition, and including all nearby upstream links whose vehicular speed is greater than the congestion threshold speed and, for a set of vehicular speeds for links downstream of a bottleneck head node, all nearby upstream links where the set of vehicular speeds less the vehicular speed is greater than the bottleneck differential speed,
    2) classifying the at least one bottleneck queue according to a shape of each queue, the shape of each queue categorized based upon a number of bottleneck head nodes and a number of bottleneck tail nodes, each bottleneck queue classified as either a linear bottleneck, a non-linear bottleneck, or a bottleneck complex to indicate whether congestion in each bottleneck queue can be hypothesized as being solely or mainly caused by conditions at the corresponding bottleneck head location,
    3) analyzing the input data to recognize bottlenecks occurring at different times or on different days as part of a common recurring bottleneck, by identifying persistent bottleneck sets from conditions defined for the similar bottlenecks occurring on identical or nearby locations on the roadway network over a range of time periods by evaluating the link-speed data over a specified time-period sequence, and comparing persistent bottlenecks to each other across a specific period of time to identify recurrent bottlenecks by extending a similarity between bottlenecks to apply to persistent bottleneck sets across that specific period of time; and
    generating output data representative of traffic congestion information for the roadway network.

22. The method of claim 21, wherein the classifying further comprises identifying the number of bottleneck head nodes and the number of bottleneck tail nodes in each bottleneck queue.

23. The method of claim 21, wherein the identifying persistent bottleneck sets further comprises defining conditions for similar bottlenecks, wherein a first bottleneck comprised of a set of detected bottlenecks for vehicular speed from a first time period and a second bottleneck comprised of a set of detected bottlenecks for vehicular speed from a second time period are similar if 1) neither of the first or second bottlenecks are in any bottleneck complex, 2) either a bottleneck head node of the first bottleneck lies within a queue of the second bottleneck, or a bottleneck head node of the second bottleneck lies within a queue of the first bottleneck, 3) no other bottleneck from the set of detected bottlenecks for vehicular speed from the first time period satisfies (1) and (2) with the second bottleneck, and 4) no other bottleneck from the set of detected bottlenecks for vehicular speed from the second time period satisfies (1) and (2) with the first bottleneck.

24. The method of claim 21, wherein the identifying persistent bottleneck sets further comprises analyzing vehicular speed over a specified time-period sequence, wherein during an nth time period, for each detected bottleneck, if there exists a similar bottleneck from the previous time period (n−1), and neither of the bottlenecks is a part of any bottleneck complex, and if the similar bottleneck is part of a persistent bottleneck set, then the similar bottleneck is also similar to all other bottlenecks in the set, then group the bottlenecks into the same persistent bottleneck set, and proceeding with preceding time periods up to a defined limit.

25. The method of claim 21, wherein the output data enables traffic performance metrics from the persistent bottleneck sets, the traffic performance metrics including prediction of bottleneck duration, prediction of recurring bottlenecks on the same day, and modeling of conduct and impact of maintenance activities performed on links in the roadway network in conjunction with known speed conditions to improve one or more of commuter time, worker safety, and cost management.

* * * * *